United States Patent [19]

Markovs et al.

[11] Patent Number: 5,354,357
[45] Date of Patent: Oct. 11, 1994

[54] REMOVAL OF MERCURY FROM PROCESS STREAMS

[75] Inventors: John Markovs, Yorktown Hts.; Richard T. Maurer, Nanuet; Andrew S. Zarchy, Amawalk; Ervine S. Holmes, Yorktown Hts., all of N.Y.

[73] Assignee: UOP, Des Plaines, Ill.

[21] Appl. No.: 151,240

[22] Filed: Nov. 12, 1993

Related U.S. Application Data

[63] Continuation-in-part of Ser. No. 24,036, Mar. 1, 1993, Pat. No. 5,271,760.

[51] Int. Cl.⁵ .................. C22B 43/00; B01D 53/04
[52] U.S. Cl. ......................... 75/670; 95/134; 423/210; 210/673; 210/688
[58] Field of Search ............. 75/670; 95/134; 423/210; 210/673, 688

[56] References Cited

U.S. PATENT DOCUMENTS

| | | | |
|---|---|---|---|
| 3,755,989 | 9/1973 | Fornoff et al. | 55/72 |
| 4,101,631 | 7/1978 | Ambrogini et al. | 423/210 |
| 4,196,173 | 4/1980 | deJong et al. | 423/210 |
| 4,500,327 | 6/1983 | Nishino et al. | 55/72 |
| 4,591,590 | 5/1986 | Horton | 423/210 |
| 4,874,525 | 10/1989 | Markovs | 210/673 |
| 4,892,567 | 1/1990 | Yan | 55/33 |
| 5,223,145 | 6/1993 | Markovs | 423/210 |

OTHER PUBLICATIONS

Barrer et al., J. Chem. Soc (1967) pp. 19–25.

Primary Examiner—Melvyn J. Andrews
Attorney, Agent, or Firm—Thomas K. McBride; John G. Tolomei; Richard P. Silverman

[57] ABSTRACT

Mercury is often removed as an impurity from process fluid streams by adsorption in fixed beds using any of several well-known adsorbents having the ability to selectively adsorb mercury. It is also common to reintroduce this sequestered mercury into the environment by means of the spent gas used to periodically regenerate the fixed beds. A solution to this problem is provided by the present invention in which the mercury is removed from the process stream using a large cyclically regenerated adsorption bed in combination with a non-regenerable secondary adsorption bed, the mercury content of the former being in part recovered as liquid mercury by passage through a condenser and in part transferred to the non-regenerated bed. Mercury leakage from the non-regenerable bed is recycled to the cyclically regenerated bed.

12 Claims, 2 Drawing Sheets

REMOVAL OF MERCURY FROM PROCESS STREAMS

CROSS REFERENCE TO RELATED APPLICATIONS

This application is a continuation-in-part of copending application Ser. No. 024,036, filed Mar. 1, 1993, now U.S. Pat. No. 5,271,760 and is herein incorporated by reference.

FIELD OF THE INVENTION

The present invention relates in general to the purification of fluid streams and more particularly to the removal of mercury entrained in liquid streams or mercury vapor from gas streams, such as natural gas, by means of adsorbing the mercury using an integrated system of a principal regenerated fixed adsorbent bed and a secondary non-regenerated fixed adsorbent bed. In the system the mercury is removed from the feed stream by initial passage through the regenerated bed. Upon regeneration of this principal bed the effluent is treated by passage through a condenser to recover a portion of the mercury content as liquid mercury and thereafter through the secondary non-regenerated bed to remove additional mercury before being recycled through the primary regenerated bed.

BACKGROUND OF THE INVENTION

Mercury is an undesirable constituent of a considerable number of fluid streams, and consequently a considerable number of methods have been devised to selectively remove the mercury. In the main the mercury impurity is in the form of elemental mercury, but in a few instances mercury compounds, including organic mercury compounds, are of concern. In the case of elemental mercury the purification processes are largely adsorption procedures, and in these the most common type of adsorbent is an activated carbon having supported thereon a mercury reactive material such as potassium triiodide, sulfur, sulfuric acid, chlorine, silver, copper or various salts of silver or copper. other supports for the mercury reactive materials include silicas, aluminas, silica-aluminas and zeolitic aluminosilicates. Ionexchange resins, particularly the strongly basic anionexchange types which have been reacted with a polysulfide, have also been reported. See U.S. Pat. No. 4,591,490 (Horton) in this latter regard. The disclosures of U.S. Pat. No. 4,500,327 (Nishino) and U.S. Pat. No. 4,196,173 (de Jong et al) are pertinent to the use of activated carbon supports.

Perhaps the two greatest problems involved in removing mercury from fluid streams are (a) achieving a sufficient reduction in the mercury concentration of the feed stream being treated, and (b) avoiding the reentry of the recovered mercury into some other environmental medium. Although permissible levels of mercury impurity vary considerably, depending upon the ultimate intended use of the purified product, for purified natural gas, mercury concentrations greater than about 0.10 microgram per normal cubic meter ($\mu g/nm^3$) are considered undesirable, particularly in those instances in which the natural gas is to be liquefied by cryogenic processing. In the cases where mercury is removed from process streams by use of non-regenerable adsorbents, very large adsorption beds have been required. This is because not only sufficient adsorbent must be present for the long term equilibrium capacity, but also enough adsorbent to contain the mass transfer (reaction) zone. In the case where the mercury removal is done by regenerative means, less adsorbent is required since only the adsorbent for containing the mass transfer zone is required. If regenerable, the regeneration media requirements are not only large but result in a large mercury-laden bed effluent which must itself be disposed of in an environmentally safe manner. A means has now been devised to combine the favorable aspects of both regenerable and non-regenerable process systems. Such a combination allows for (a) attaining the lowest possible mercury levels in the process streams, (b) making full utilization of the non-regenerative mercury removal adsorbent, and (c) disposing of the mercury in an environmentally safe manner.

SUMMARY OF THE INVENTION

Figure 1:
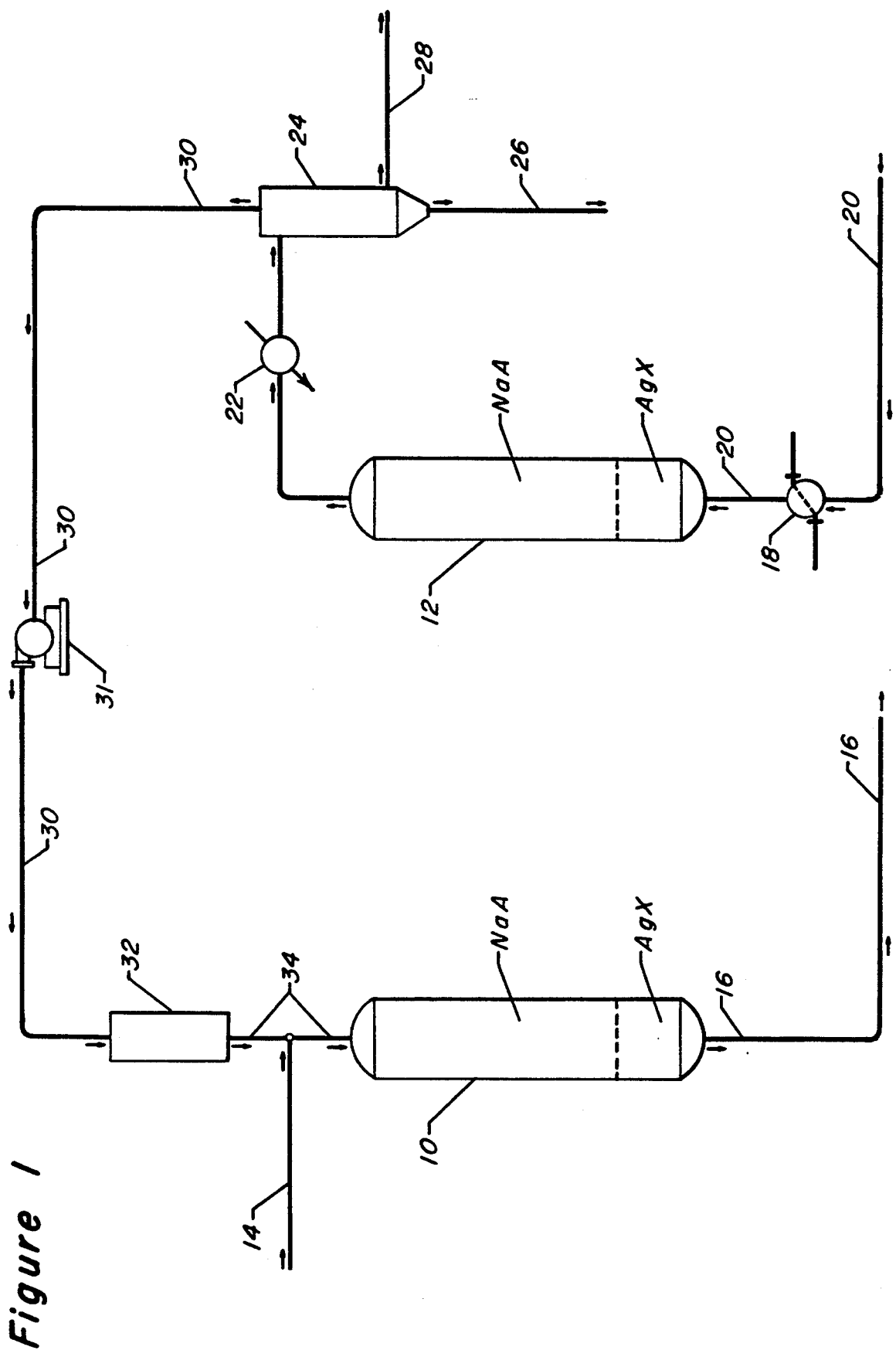
FIG. 1 is a schematic flow diagram showing one embodiment of the process system used in the practice of this invention.

In accordance with the present invention the cyclic process comprises: (a) providing a fluid stream containing at least 0.02 $\mu g/nm^3$ of elemental mercury; (b) passing the fluid stream into a regenerable fixed adsorption bed containing an adsorbent on which said mercury is preferentially adsorbed whereby mercury is adsorbed, a mercury mass transfer front is established and a purified product effluent is recovered; (c) terminating the flow into the regenerable fixed adsorption bed prior to breakthrough of the mercury mass transfer front; (d) regenerating the regenerable fixed adsorption bed by passing therethrough, preferably in a direction countercurrent to the direction of flow therethrough during step (b), a purge desorbent whereby mercury is desorbed and removed from said bed in a regenerant effluent stream; (e) cooling said regenerant effluent stream to condense out a portion of the mercury content thereof and recovering a liquid mercury condensate; (f) passing the remaining portion of the regenerant effluent stream into a non-regenerable adsorption bed containing an adsorbent for mercury and recovering a non-regenerable bed effluent stream further depleted in mercury content; and (g) combining the non-regenerable bed effluent stream recovered in step (f) with the fluid stream provided in step (a).

In another embodiment, the invention is a process for removing mercury from a fluid stream comprising a series of steps. The fluid stream contains at least 0.02 $\mu g/nm^3$ of elemental mercury. The fluid stream is passed to a first regenerable adsorption bed of at least two regenerable adsorption beds. Each of the regenerable adsorption beds contains an adsorbent on which mercury is preferentially adsorbed. A mercury mass transfer front is established. A first product effluent essentially free of mercury is recovered from the first adsorption bed. The flow of the fluid stream to the first regenerable adsorption bed is terminated prior to breakthrough of the mercury mass transfer front. The fluid stream is passed to another regenerable adsorption bed and a second product effluent is withdrawn. At least a portion of the second product effluent is heated and passed to the first regenerable adsorption bed to regenerate the first regenerable adsorption bed and a regenerant effluent stream comprising mercury is withdrawn. The regenerant effluent stream is cooled to condense out a portion of the mercury to provide a non-condensable stream comprising mercury and a liquid mercury condensate. The liquid mercury condensate is recovered. The non-condensable stream is passed to a non-regenerable adsorption bed containing an adsorbent selective for the adsorption of mercury and a third adsorption effluent stream comprising a leakage of mercury from the non-regenerable adsorption bed is withdrawn. The third adsorption effluent stream is combined with the fluid steam and the process steps are repeated to provide a continuous process.

It was unexpectedly discovered that essentially all of the adsorbed mercury in the first regenerable bed desorbs at a relatively rapid rate forming a mercury composition peak. The use of the non-regenerable bed on the non-condensed portion of the regeneration effluent serves to capture at least a portion of the uncondensed mercury composition peak and permits the use of a smaller condenser than in schemes without the non-regenerable bed, and thus provides a low capital cost scheme.

DETAILED DESCRIPTION OF THE INVENTION

In carrying out the present process the adsorption system employed comprises a principal regenerable fixed adsorption bed and a secondary non-regenerable fixed adsorption bed. As used herein the term non-regenerable as applied to the secondary bed is not used in the absolute sense to mean that regeneration of the adsorbent is impossible but rather that regeneration, if in fact feasible, is not cyclically carried out as an integral part of the process scheme. The function of the non-regenerable bed is to provide a long-term equilibrium capacity for adsorbed mercury. When the capacity of the bed to adsorb additional mercury is reached, the adsorbent containing the adsorbed mercury is removed from the system and further treated or stored in an environmentally safe manner. It is important, therefore, that adsorbed mercury content of this non-regenerable bed be maximized before its removal from the adsorption system. It is found, however, that before the bed's capacity to adsorb mercury is exceeded, the mercury content of the bed effluent stream increases beyond acceptable levels for reintroduction into the environment. The process of the present invention provides a means to fully utilize the mercury capacity for the non-regenerable bed and still maintain very low mercury concentrations in product and regeneration gas streams flowing from the system. In the process the mercury content of the purified product is controlled by the operation of the principal regenerable adsorption bed. The product effluent from this bed is monitored for mercury content and the adsorption-purification step terminated at or before a predetermined breakthrough level of mercury. Thereupon this principal bed is regenerated by purge desorption at an elevated temperature and the purge stream effluent is treated to remove a portion of its mercury content by cooling and condensation. The resulting liquid mercury is easily removed from the system and can readily be isolated in a non-polluting manner. According to this invention, a small non-regenerable bed can be employed to capture the uncondensed portion of the mercury. The remaining mercury content of the stream used to regenerate the principal bed is then removed to the desired degree by passage through the non-regenerable bed and then recycled through the principal regenerable bed. This procedure permits significant levels of a "leakage" of mercury from the non-regenerable secondary bed while maximizing the adsorbed mercury loading therein. Since the effluent from the secondary bed is not vented out of the system, the levels of mercury in this effluent can be much higher than otherwise would be permissible.

Accordingly the adsorbent contained in the secondary non-regenerable bed is advantageously one which is relatively inexpensive yet has a capacity to accumulate a high loading of adsorbed mercury when contained in fluid streams containing concentrations of mercury significantly higher than the feed stream introduced initially into the adsorption system. A preferred adsorbent for the secondary bed is selected from the various activated carbon-supported compositions, particularly those containing sulfur or sulfur compounds reactive with mercury, or the copper or sulfur loaded aluminosilicate zeolites such as zeolite X and zeolite Y in the alkali metal and alkaline earth metal cation forms. The $Hg^{++}$ cation forms of zeolites X and Y are reported by Barrer et al. (J. Chem. Soc. (1967) pp. 19–25) to also exhibit very large capacities for mercury adsorption due to the chemisorption of metallic mercury at the $Hg++$ cation sites to form $Hg_2^{++}$ cations initially and then to proceed further to create clusters of mercury within the zeolite in accordance with the proposed equation:

$$Hg_2^{++} + xHg - Hg_{x+2}$$

Copper sulfide carried on an alumina support has also been reported to be a satisfactory adsorbent for the bulk removal of mercury from gas streams. The specific mention of these materials is not intended to be limitative, the composition actually selected being a matter deemed most advantageous by the practitioner given the particular circumstances to which the process is applied.

As described to hereinbefore, the function of the principal, i.e., regenerable, bed is to strongly adsorb mercury even when present in very low concentrations. The adsorbent for use in this bed is selected on the basis of that property. Since, moreover, the principal bed is to be repeatedly regenerated in situ in the system, the initial cost of the adsorbent is less of a factor in its selection. An especially effective adsorbent for this purpose is one of the zeolite-based compositions containing cationic or finely dispersed elemental forms of silver, gold, platinum or palladium. A particularly preferred adsorbent of this type is disclosed in U.S. Pat. No. 4,874,525 (Markovs) wherein the silver is concentrated on the outermost portions of the zeolite crystallites. More specifically the adsorbent is formed of particles comprised of crystallites of a zeolitic molecular sieve having pore diameters of as least 3.0 Angstroms and in which the said zeolite crystallites forming the outer shell of the adsorbent particles to a depth of not greater than about 0.1 millimeter into the particles and constituting less than about 35 volume percent of said particles, contain ionic or elemental silver. The remainder of the overall adsorbent particles are preferably free of silver. Zeolite A containing elemental gold is disclosed as an adsorbent for mercury in the later issued U.S. Pat. No. 4,892,567 (Yan).

The mercury-containing fluid stream suitably treated by the present process can be either in the liquid or the vapor state. The constituents other than mercury are not critical except in those cases in which such constituents seriously attack the particular adsorbents involved in the process and render same incapable of functioning to selectively adsorb and retain mercury. Typical streams are natural gas streams, which can contain as high as 22 parts per billion (vol.) mercury vapor along with carbon dioxide, water vapor, hydrogen and higher hydrocarbons as impurities, byproduct hydrogen streams from the commercial production of chlorine by the electrolysis of sodium chloride using a mercury-containing electrode, helium and other inert gases, furnace stack gases, battery disposal incinerator gases, air, hydrocarbons such as ethylene (cracked gas), light and heavy naphtha fractions, liquefied petroleum gas, dripolene and the like.

In carrying out the present process it will be understood that for continuous operation over an appreciable period it is necessary that there be at least two principal beds capable of initially receiving and purifying the feedstock being treated in order that one principal bed can be regenerated while another is engaged in the adsorption purification step. While highly desirable, continuous operation is not, however, essential in the practice of the present invention.

The temperature and pressure conditions for the cyclic adsorption and regeneration steps in the principal beds are not critical and depend to some degree upon the particular feedstock being purified and whether the process is to be carried out in the liquid or in the vapor phase. In treating natural gas or other hydrocarbon streams, temperatures typically range from −40° C. to 100° C. in the beds during the adsorption/purification step. Preferably the feedstocks are processed by the present process in the temperature range of about −20° C. to about 100° C. During regeneration the purge medium is heated to at least 100° C., and preferably at least 200° C. higher than the temperature of the feedstock being purified. Pressure conditions can range from about 200 kPa (30 psia) to about 13.8 MPa (2000 psia) and are generally not critical, except of course during liquid phase operation wherein it is necessary to maintain sufficient pressure at the operating temperature to avoid vaporization of the feedstock and regeneration medium.

In treating the mercury-containing effluent from a primary bed during bed regeneration to condense out liquid mercury, conventional cooling and knock-out apparatus is suitably employed. The temperature to which the regeneration effluent is cooled during this procedure is preferably not greater than about 60° C. and is advantageously as low as economically practical taking into account the chemical composition of the fluid stream being treated. In those instances in which the fluid stream contains water and/or carbon dioxide in addition to hydrocarbons, such as is typically the case with natural gas, the temperature and pressure conditions must be correlated to avoid undue formation of hydrocarbon hydrate or $CO_2$ hydrate formation.

A preferred embodiment of the present invention is illustrated by the following example together with the flow diagram of the drawings. In the drawing the process system is represented by dual principal adsorption beds integrated with a single non-regenerable secondary bed in a manner that continuous operation can be carried out by regenerating one primary bed while the other bed is involved in the adsorption of mercury. It will be understood by those of routine skill in the art that not all of the conduits and valves which would be present in an actual process system are shown in the flow diagram. The placement of these flow-directing means is largely dependent upon the placement of the essential adsorption beds and is not a matter necessary to an understanding of the process. In this embodiment the feedstock being treated for mercury removal is a substantially $CO_2$ free (i.e., containing less than 10 ppm-v $CO_2$) natural gas stream containing water vapor. The process is carded out in the vapor phase. Since all of the mercury adsorbents employed in the present process will also adsorb water and higher hydrocarbons, it is advantageous to employ as principal beds composite fixed adsorbent beds which contain in the bed section first contacted by the stream being treated an adsorbent relatively free of cations or compounds strongly reactive with mercury but which exhibits an appreciable capacity for water adsorption. The alkali metal aluminosilicate zeolites, such as sodium zeolite A and sodium zeolite X are very useful in this regard. A subsequent zone of the adsorption bed can be loaded with an adsorbent, such as silver-exchanged zeolite A or zeolite X, which has a high capacity for mercury. A composite bed of this kind is disclosed in U.S. Pat. No. 4,874,525. Such a bed is utilized as the primary bed in the process illustrated below:

With reference to the drawing, primary composite beds 10 and 12 each contain 49,000 pounds of ⅛" extruded sodium zeolite A pellets in the upper zone, and in the lower zone 7,970 pounds of ⅛" extruded zeolite X pellets having 13.6 weight percent silver as zeolite cations, 95 percent of which are located within 0.1 millimeters of the external surface of the pellets. Natural gas, from which $CO_2$ has previously been removed, containing 649 ppm(v) water vapor, 14 parts per billion [ppb (v)] mercury vapor and about 5 volume percent $C_2$–$C_7$ hydrocarbons, is passed into bed 10 through line 14 at a pressure of about 3.83 MPa (555 psia), a temperature of 21° C. and a superficial space velocity of 35.3 feet per minute. Water vapor is adsorbed in the upper zone on the NaA zeolite. The resulting dried natural gas containing the mercury vapor then passes through the lower zone containing the AgX zeolite whereby the mercury content is reduced to less than 10 parts per trillion and is recovered through line 16. During the adsorption step in bed 10, bed 12 which has previously undergone the same adsorption purification step as in bed 10, is undergoing regeneration. A portion of the purified product natural gas from bed 10 is passed through heater 18, wherein it is heated to 315° C., and a portion of the heated gas stream is directed at a pressure of about 3.76 MPa (545 psia) through line 20 countercurrently through bed 12. Mercury, water vapor and some $C_2$–$C_7$ hydrocarbons are desorbed from the two adsorption zones of the bed and the effluent is directed through chiller 22 in which the temperature is reduced to about 21° C. (70° F.). Under the existing pressure conditions, about 3.72 MPa (540 psia), the formation of hydrocarbon hydrates is avoided so that in separator 24 condensed mercury vapor is removed as a liquid through line 26 and condensed water vapor is withdrawn through line 28. The vapor phase stream comprising principally methane saturated with water vapor and containing about 393 $\mu g/nm^3$ mercury vapor is then passed through blower 31 at a temperature of about 24° C. (75° F.) through line 30 into bed 32 which contains activated charcoal impregnated with sulfur. After a period of several days following start-up of the process, the effluent stream leaving bed 32 through line 34 contains a leakage of mercury ranging from about 0.1 to 10 $\mu g/nm^3$ of mercury vapor and is admixed with fresh feedstock natural gas entering the system through line 14, thus limiting the mercury entering the primary beds 10 and 12 to that amount contained in the natural gas feedstream.

As will be readily apparent to those of routine skill in the an in view of the foregoing, a number of modifications of the illustrated process scheme can be made without departing from the proper scope of this invention. For example, the secondary bed can contain the more strongly adsorbing silver-loaded or other noble metal containing zeolite or similar adsorbent as used in the principal bed. Such a bed can be regenerated periodically after several process cycles as required by means of purge desorption either in situ in the system or after removal from the system. The bed is, however, still considered to be non-regenerable within the context of this invention.

EXAMPLES

Example I

Figure 2:
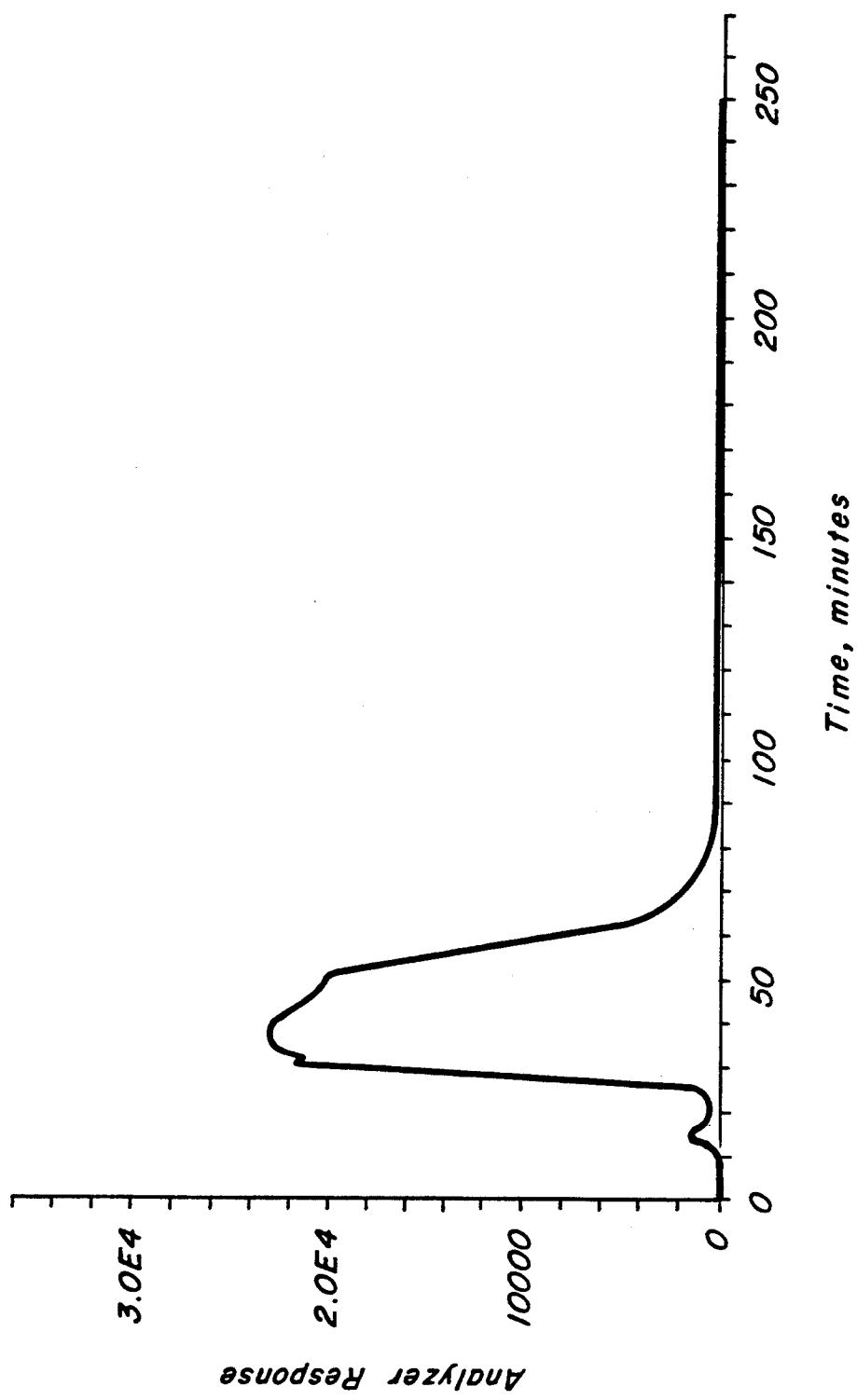
FIG. 2 is a graph of the mercury desorption from an adsorbent selective for the adsorption of mercury in a regenerable adsorption bed.

A sample of the adsorbent disclosed in U.S. Pat. No. 4,874,525 herein referred to as HgSIV, and containing mercury was placed in the injection port of a Hewlett Packard GC-AED (gas chromatograph-atomic emission spectroscopy dector). The sample was then heated to a constant temperature of about 232° C. for a period of about 160 minutes and then rapidly increased to a temperature of about 320° C. The dector response was measured. As shown in FIG. 2, essentially all of the mercury desorbed rapidly in a single sharp mercury composition peak after between 25 and 65 minutes. The test was continued for 200 minutes. No additional mercury was desorbed even with increasing temperature. An analysis of the HgSIV adsorbent confirmed that essentially all of the mercury was removed during the regeneration procedure.

These results indicate that in a regeneration step essentially all of the mercury would be removed at a rapid rate. A condenser designed to cool and condense all of the mercury at once would require a very large condenser which would be quite expensive. Furthermore, a large condenser would further lower the temperature of the effluent, thus increasing the possibility of hydrate formation and associated plugging problems. However, if a small non-regenerable adsorber were employed to capture some of the uncondensed mercury with the remainder, or leakage, returned to be mixed with the feed to the regenerable adsorption bed an efficient process would result.

What is claimed:

1. Process for removing mercury impurities from fluid streams which comprises the steps of:
   (a) providing a fluid stream containing at least 0.02 $\mu g/nm^3$ of elemental mercury;
   (b) passing said fluid stream into a regenerable fixed adsorption bed containing an adsorbent on which said mercury is preferentially adsorbed whereby mercury is adsorbed, a mercury mass transfer front is established and a purified product effluent is recovered;
   (c) terminating the flow into said regenerable bed prior to breakthrough of the mercury mass transfer front;
   (d) regenerating said regenerable bed by passing therethrough a purge desorbent whereby mercury is desorbed and removed from said bed in a regenerant effluent stream;
   (e) cooling said regenerant effluent stream to condense out a portion of the mercury content thereof and recovering a liquid mercury condensate;
   (f) passing the remaining portion of the regenerant effluent stream into a non-regenerable adsorption bed containing an adsorbent for mercury and recovering a non-regenerable bed effluent stream further depleted in mercury content; and
   (g) combining the non-regenerable bed effluent stream with the fluid stream provided in step (a).

2. Process according to claim 1 wherein in step (d) the regenerable fixed adsorption bed is regenerated by passing the purge desorbent stream therethrough in a direction countercurrent to the direction of flow therethrough in step (b).

3. Process according to claim 1 wherein the fluid stream being treated for mercury removal is natural gas.

4. The process according to claim 1 wherein said fluid stream contains at least 2.0 $\mu g/nm^3$ of elementary mercury.

5. Process according to claim 1 wherein the adsorbent in the regenerable fixed adsorption bed comprises particles containing at least one metal selected from the group consisting of silver, gold, platinum and palladium.

6. Process according to claim 5 wherein the adsorbent particles in said regenerable fixed adsorption bed comprise crystallites of a zeolitic molecular sieve having pore diameters of at least 3.0 Angstroms and in which the said zeolite crystallites forming the outer shell of the adsorbent particles to a depth of not greater than about 0.1 millimeter into the particles and constituting less than about 35 volume percent of said particles contain ionic or elemental silver.

7. Process according to claim 6 wherein the zeolitic molecular sieve having pore diameters of at least 3.0 Angstroms is zeolite A or zeolite X.

8. Process according to claim 5 wherein the adsorbent in the non-regenerable adsorption bed comprises an activated carbon containing sulfur or a sulfur compound.

9. A process for removing mercury impurities from a fluid stream said process comprising the following steps:
   (a) providing said fluid containing at least 0.02 $\mu g/nm^3$ of elemental mercury;
   (b) passing said fluid stream at an adsorption temperature into a first regenerable adsorption bed of at least two regenerable adsorption beds, each of said regenerable beds containing an adsorbent on which mercury is preferentially adsorbed, establishing a mercury mass transfer front in said regenerable bed, and recovering a first product effluent essentially free of mercury;
   (c) terminating the flow into said first regenerable adsorption bed prior to breakthrough of the mercury mass transfer front and passing said fluid stream to another regenerable adsorption bed and withdrawing a second product effluent;
   (d) heating and passing at least a portion of said second product effluent to said first regenerable adsorption bed to regenerate said first regenerable adsorption bed and withdrawing a regenerant effluent stream comprising mercury;

(e) cooling said regenerant effluent stream to condense out a portion of said mercury to provide a non-condensable stream comprising mercury and a liquid mercury condensate, and recovering said liquid mercury condensate;

(f) passing the non-condensable stream to a non-regenerable adsorption bed containing an adsorpent selective for the adsorption of mercury and withdrawing a third adsorption effluent stream comprising a leakage of mercury from said non-regenerable adsorption bed:

(g) combining the third adsorption effluent stream with said fluid stream and repeating steps (a) through (f) to provide a continuous process.

10. The process of claim 9 wherein said leakage of mercury ranges from about 0.1 to 10 $\mu g/nm^3$ of mercury vapor.

11. The process of claim 10 wherein said first product effluent comprises a mercury content of less than about 10 parts per trillion.

12. The process of claim 11 wherein the adsorption temperature ranges from about $-20°$ C. to about $100°$ C.

* * * * *